United States Patent
Peasley et al.

(10) Patent No.: US 9,155,331 B2
(45) Date of Patent: Oct. 13, 2015

(54) DEVICE AND METHOD FOR ADDING FLAVORING TO A LIQUID

(71) Applicant: Grand Canyon Brewing Company, Williams, AZ (US)

(72) Inventors: John Peasley, Flagstaff, AZ (US); Andrew Carricato, Williams, AZ (US)

(73) Assignee: Grand Canyon Brewing Company, LLC, Williams, AZ (US)

( * ) Notice: Subject to any disclaimer, the term of this patent is extended or adjusted under 35 U.S.C. 154(b) by 0 days.

(21) Appl. No.: 13/644,799

(22) Filed: Oct. 4, 2012

(65) Prior Publication Data
US 2013/0189412 A1 Jul. 25, 2013

Related U.S. Application Data

(60) Provisional application No. 61/590,429, filed on Jan. 25, 2012.

(51) Int. Cl.
| | | |
|---|---|---|
| *A47J 31/00* | (2006.01) | |
| *B65D 85/00* | (2006.01) | |
| *C12H 1/04* | (2006.01) | |
| *A23L 2/56* | (2006.01) | |
| *B65B 29/02* | (2006.01) | |

(52) U.S. Cl.
CPC . *A23L 2/56* (2013.01); *B65B 29/02* (2013.01); *B65B 2220/14* (2013.01)

(58) Field of Classification Search
CPC .................................. A23L 2/56; B65B 29/02
USPC .......... 206/222, 219, 217, 218, 221; 426/442, 426/390, 392, 394, 408, 431; 99/323, 323.2
See application file for complete search history.

(56) References Cited

U.S. PATENT DOCUMENTS

| | | | | | |
|---|---|---|---|---|---|
| 1,931,765 | A | * | 10/1933 | Leever | 426/78 |
| 3,458,076 | A | * | 7/1969 | Babcock | 215/6 |
| 3,513,886 | A | * | 5/1970 | Easter et al. | 426/115 |
| 4,345,512 | A | * | 8/1982 | Moore | 99/323 |
| 4,399,158 | A | * | 8/1983 | Bardsley et al. | 426/112 |
| 4,423,670 | A | * | 1/1984 | Tenison | 99/275 |
| 4,605,123 | A | | 8/1986 | Goodrum et al. | |
| 5,246,142 | A | * | 9/1993 | DiPalma et al. | 222/129 |
| 5,481,960 | A | * | 1/1996 | Sullivan | 99/277.1 |
| 5,906,845 | A | * | 5/1999 | Robertson | 426/80 |
| 6,024,012 | A | * | 2/2000 | Luzenberg, Jr. | 99/323 |
| 6,644,471 | B1 | * | 11/2003 | Anderson | 206/222 |
| 7,051,648 | B2 | * | 5/2006 | Fenaroli | 99/321 |
| 7,175,037 | B2 | * | 2/2007 | Deir | 215/10 |

(Continued)

*Primary Examiner* — Dana Ross
*Assistant Examiner* — Ket D Dang
(74) *Attorney, Agent, or Firm* — Schmeiser, Olsen & Watts LLP

(57) ABSTRACT

A device for adding a flavoring product to a liquid includes a tubular body having openings extending through a sidewall of the body to an interior cavity. A flavoring product is loaded into the interior cavity. At least one fin is coupled to the tubular body and extends outwardly from the sidewall. The device, with the flavoring product loaded therein, is inserted into a container and a liquid is added to the container. The openings in the tubular body are sized to admit the liquid into and out of the interior cavity to enable infusion of the flavoring product into the liquid and to discharge the flavored liquid. The fin is configured such that following insertion into the container, the fin is positioned to largely prevent the tubular body of the device from blocking the opening into the container and inhibiting discharge of the liquid.

15 Claims, 3 Drawing Sheets

(56) References Cited

U.S. PATENT DOCUMENTS

| | | | |
|---|---|---|---|
| 7,296,508 B2 * | 11/2007 | Hillyer | 99/323.2 |
| 2002/0090426 A1 * | 7/2002 | Denny | 426/120 |
| 2004/0178086 A1 * | 9/2004 | Sawaguchi | 206/219 |
| 2007/0169634 A1 | 7/2007 | Khalifa | |
| 2008/0089992 A1 * | 4/2008 | Kramer | 426/590 |
| 2010/0221404 A1 | 9/2010 | Little | |
| 2010/0313767 A1 * | 12/2010 | Kramer | 99/323 |

\* cited by examiner

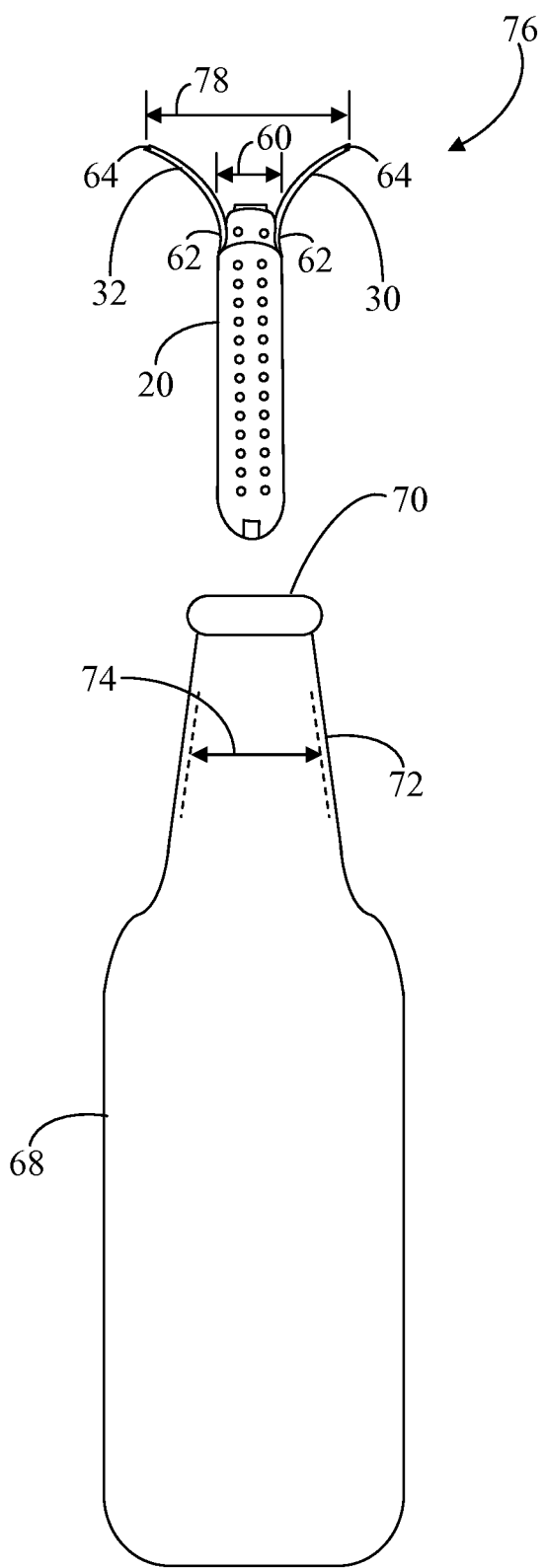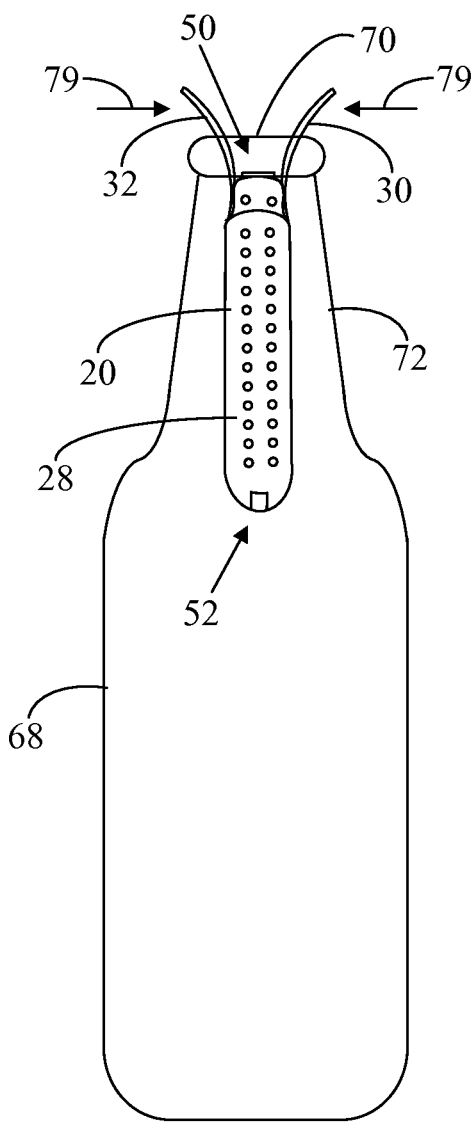

DEVICE AND METHOD FOR ADDING FLAVORING TO A LIQUID

TECHNICAL FIELD OF THE INVENTION

The present invention relates generally to food and beverage products. More specifically, the present invention relates to adding flavoring to a liquid.

BACKGROUND OF THE INVENTION

A plethora of alcoholic and non-alcoholic beverages exists for the consumer to drink. Beer is considered to be the world's most widely consumed alcoholic beverage, and it is the third-most popular drink overall, after water and tea. The basic ingredients of beer are water, a starch source able to be converted to sugars, such as malted barley, a brewer's yeast to produce the fermentation, and a flavoring such as hops. Consumers and home brewers are becoming increasingly intrigued by expanding flavor pallet profiles of beer.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a front view of the device at an initial stage of being inserted into a bottle;

FIG. 5 shows a front view of the device being inserted through the neck of the bottle;

DETAILED DESCRIPTION

Figure 1:
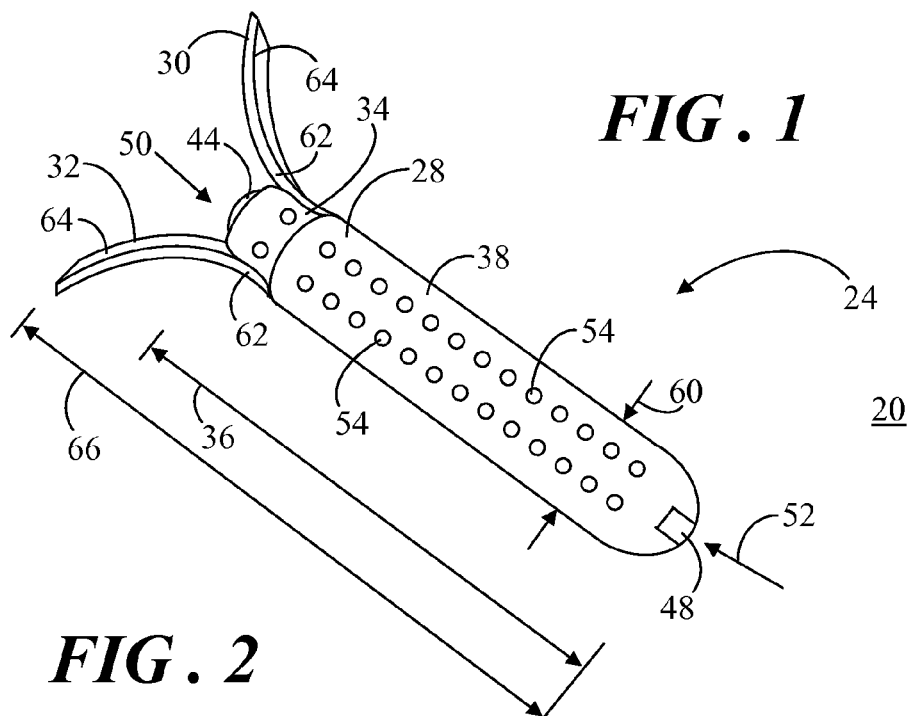
FIG. 1 shows a perspective view of a device for adding a flavoring product to a liquid.

In addition to the traditional ingredients of water, malt, hops, and yeast, flavoring products are increasingly being used in beer. Indeed, breweries and home brewers are adding flavoring products during the brewing process, fermentation, or cold conditioning stages of producing beer. For example, beers are being brewed with fruit, nuts, spices, vegetables, plants, cactus, and so forth. Beers are aged in oak barrels and used bourbon barrels, and cold storage tanks are filled with hops to give an extra hop smell to the beer.

Many flavoring products can be placed into two groups, spices and fruits. Spices are traditionally used in some countries in seasonal beers around the time of winter holidays, for example, Christmas. Popular spices are clove, ginger, nutmeg, cinnamon, cardamom, and orange peel. These beers tend to be heavier ales, with the spices substituting for some of the hopping. Typical fruits added to beers include cherries, raspberries, apricots, blackberries, marion berries, and passion fruit. Vegetables are sometimes also used, notably chiles for spicy beers and pumpkin around the time of autumn holidays. And still other flavoring products include cacao, coffee, vanilla beans, and so forth.

In order to fully extract flavors or the desired flavor profile, a flavoring product may need to be immersed in the beer for a sufficient amount of time, e.g., for months. For breweries, it may not be cost effective to store beer for the time necessary to fully extract the flavors or the desired flavor profile. Furthermore, a consumer may be hesitant to purchase and/or drink a beverage with a particular flavor profile because they cannot visualize the flavoring product in the beverage or they may be concerned that the particular flavoring product is an extract or an otherwise chemically derived substance.

Embodiments entail a device and methodology for adding a flavoring product to a liquid after the production period and during the packaged period. The liquid may be an alcoholic or non-alcoholic beverage. In a particular embodiment, the device and methodology are described in connection with adding a flavoring product to beer. However, the device and methodology may be readily implemented for adding flavoring products to any consumable beverage.

In accordance with embodiments described herein, the flavoring product is loaded into the device. The device is then inserted into a container, such as a beer bottle, containing a liquid, such as beer. The device is retained in the container for an amount of time sufficient to allow flavor to be extracted from the flavoring product and to infuse into the liquid. The presence of the device in the container can enhance customer appeal because they can actually see the flavoring product in their beer. Accordingly, the container filled with a liquid and the device can be marketed and sold, thus allowing the additional time needed for greater extraction of the flavoring product. Furthermore, the device can be readily utilized by home brewers, craft brewers, and microbreweries who wish to experiment with and impart their own unique flavor profiles to their beer.

Figure 2:
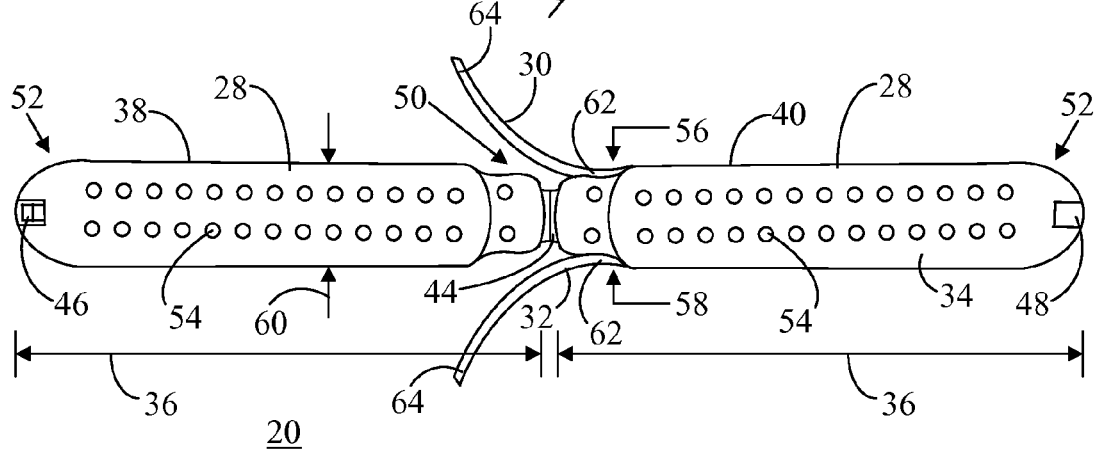
FIG. 2 shows a top view of the device of FIG. 1 in a fully open position.
Figure 3:
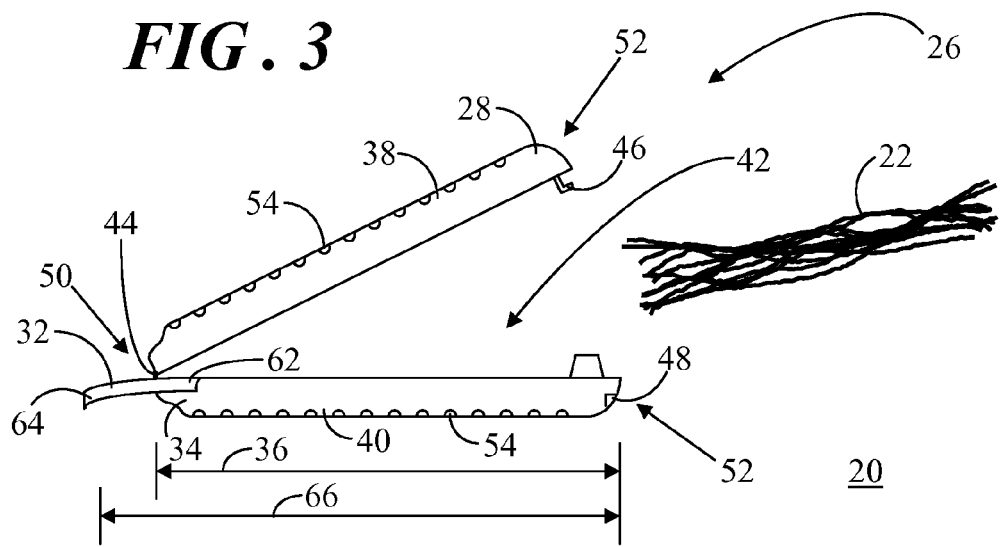
FIG. 3 shows a side view of the device of FIG. 1.

Referring to FIGS. 1-3, FIG. 1 shows a perspective view of a device 20 for adding a flavoring product 22 to a liquid. FIG. 2 shows a top view of device 20 in a fully open position, and FIG. 3 shows a side view of device 20. In FIG. 1, device 20 is illustrated in a closed configuration 24 and in FIG. 3, device 20 is illustrated in an open configuration 26 with flavoring product 22 being installed in device 20. Thus, device 20 may additionally be referred to herein as flavoring device 20. In general, flavoring device 20 includes a substantially rigid tubular body 28, and at least one fin coupled to tubular body 28. In the illustrated embodiment, device 20 includes a first fin 30 and a second fin 32 extending outwardly from a sidewall 34 of tubular body 28. However, in alternative embodiments, device 20 may include one or more than two fin structures extending from sidewall 34.

Tubular body 28 is longitudinally divided into two halves. That is, tubular body 28 exhibits a lengthwise dimension 36, and tubular body 28 includes a first portion 38 and a second portion 40, where first portion 38 is a first half of tubular body 28 aligned with lengthwise dimension 36 and second portion 40 is a second half of tubular body 28 aligned with lengthwise dimension 36. Tubular body 28 includes an interior cavity 42 adapted to hold flavoring product 22. Thus, tubular body 28 is longitudinally divided into first and second portions 38 and 40 so that flavoring product 22 can be easily and conveniently loaded into an interior cavity 42 of tubular body 28. However, in alternative embodiments, tubular body 28 may be widthwise divided at any location along tubular body 28 so that flavoring product 22 can be loaded into interior cavity 42.

A hinge 44 is coupled to each of first and second portions 38 and 40, respectively, for moving first and second portions 38 and 40 between open configuration 26 and closed configuration 24. A lock element 46, in the form of a hook, extends from first portion 38 and a receiver element 48 is formed in second portion 40. When first and second portions 38 and 40 are moved to closed position 24, lock element 46 engages with receiver element 48 to retain tubular body 28 in closed configuration 24.

In an embodiment, hinge 44 is positioned at a first end 50 of tubular body 28 near first and second fins 30 and 32. Thus, lock element 46 and receiver element 48 are located on an opposing second end 52 of tubular body 28. In this manner, when first and second portion 38 and 40 are moved to open configuration 26 an entire length of interior cavity 42 can be accessed, which is particularly useful when flavoring product 22 is of a relatively large size. In alternative embodiments, hinge 44 may be located at second end 52 and lock and receiver elements 46 and 48, respectively, may be located at first end 50. In still other embodiments, hinge 44 and lock and receiver elements 46 and 40 may be positioned at any suitable location in sidewall 34 of tubular body 28 for facilitating access to interior cavity 42.

Device 20 may be fabricated from a high strength food grade plastic material, such as polypropylene plastic, so that plastic or any other foul tasting notes will not infuse into the liquid in which device 20 is placed. First and second portions 38 and 40 of tubular body 28 include a plurality of openings 54. Openings 54 are sized to confine flavoring product 22 within interior cavity 42, but large enough to admit a liquid, such as beer, into interior cavity 42 to enable infusion of flavoring product 22 into interior cavity 42 and to discharge the flavored liquid from interior cavity 42. Openings 54 are designed to enable maximum flow of liquid into and out of interior cavity 42 of tubular body 28.

As shown, first and second fins 30 and 32 are coupled to and extend from sidewall 34 of tubular body 28 proximate first end 50. First and second fins 30 and 32 are positioned opposite one another on opposing sides 56 and 58 of tubular body 28 according to a widthwise dimension 60 of tubular body 28.

Each of first and second fins 30 and 32 includes a proximal section 62 coupled to sidewall 34 of tubular body 28 and a distal section 64 coupled with proximal section 62. Together, proximal section 62 and distal section 64 are formed as a contiguous element so that each of first and second fins 30 and 32 has a continuous outwardly curved shape. More specifically, proximal section 62 extends from tubular body 28 in approximate alignment with lengthwise dimension 36 of tubular body 28 and distal section 64 curves and extends outwardly relative to sidewall 38. A device length 66 of device 20 includes tubular body 28 and first and second fins 30 and 32 extending beyond lengthwise dimension 36 of tubular body 28. Thus, device length 66 of device 20 is greater than the length of tubular body 28 in lengthwise dimension 36.

FIG. 4 shows a front view of device 20 at an initial stage of being inserted into a bottle 68. Device 20 is configured for insertion through an opening in a container. In this example, the container is bottle 68 having an opening 70 into a neck 72 of bottle 68. In other embodiments, the container may be a can, bottle, or any other suitable beverage or food product container.

Widthwise dimension 60, i.e. a diameter, of tubular body 28 is less than an inner diameter 74 of neck 72 so that tubular body 28 of device 20 can be readily inserted into bottle 68 via opening 70. For example, widthwise dimension 60 may be approximately 16.8 mm (i.e., 0.66 inches) which would allow device 20 to be inserted through a majority of beer bottles in the American market. However, device 20 may be produced in any size suitable for a particular beverage container.

Prior to passage through neck 72, first and second fins 30 and 32, respectively, are in a neutral position 76 extending outwardly from tubular body 28. When first and second fins 30 are in neutral position 76, a distance 78 between distal section 64 of first fin 30 and distal section 64 of second fin 32 is greater than diameter 74. However as will be demonstrated below, first and second fins 30 and 32 are flexible members. As such, each of first and second fins 30 and 32 is capable of flexing inwardly relative to widthwise dimension 60 of tubular body 28 so that device 20 can be inserted into bottle 68.

FIG. 5 shows a front view of device 20 being inserted through neck 72 of bottle 68. Methodology for adding flavoring product 22 to a liquid entails loading flavoring device 20 with flavoring product 22, as discussed above and particularly illustrated in FIG. 3. Flavoring device 20 is then inserted through opening 70 in neck 72 of bottle 68. Flavoring device 20 may be inserted manually or by an automated plunging system. Second end 52 of tubular body 28 is installed into bottle 68 followed by first end 50 of tubular body 28. Thus, second end 52 is considered a leading end herein. And, first end 50, having first and second fins 30 and 32, is considered a trailing end.

Due to their flexibility, first and second fins 30 and 32 flex inwardly, as indicated by arrows 79, to allow flavoring device 20 to be inserted into bottle 68. Thus, the force imparted on the flexible first and second fins 30 and 32 by the inner walls of neck 72 causes first and second fins 30 and 32 to flex inwardly. Following insertion of flavoring device 20 into bottle 68, additional operations may entail rinsing and sanitizing bottle 68, pre-evacuating bottle 68 with carbon dioxide, adding a liquid (e.g., beer) into bottle 68, and capping bottle 68. Once capped, the exterior of bottle 68 may be rinsed and readied for packaging.

Figure 6:
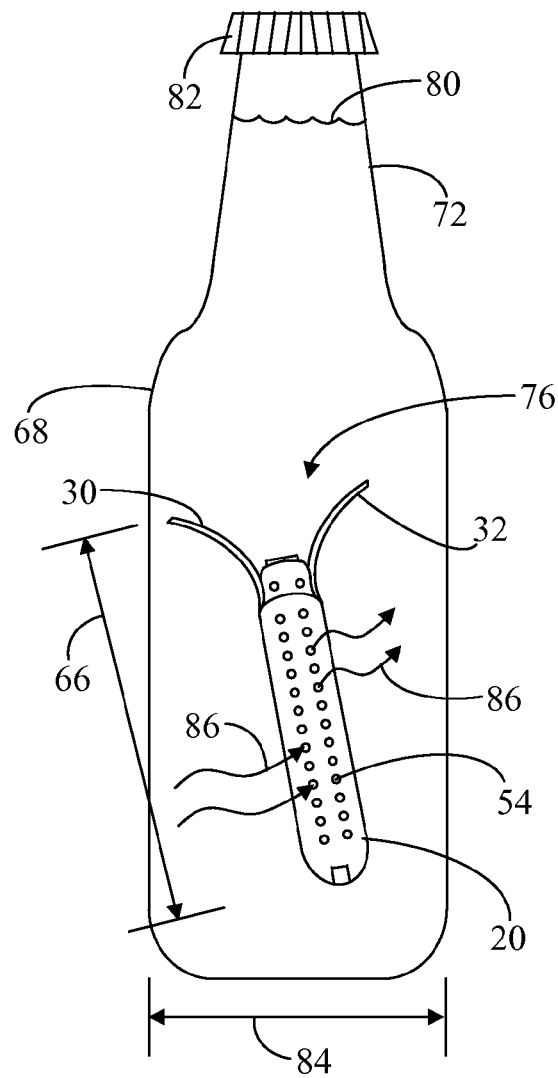
FIG. 6 shows a front view of the device fully installed in the bottle.

FIG. 6 shows a front view of device 20 fully installed in bottle 68. In the illustration of FIG. 6, bottle 68 has been filled with a liquid 80 and opening 70 (FIG. 4) has been sealed with a cap 82. Following insertion into bottle 68, first and second fins 30 and 32 of flavoring device 20 spring outwardly to return to neutral position 76. In an embodiment, device length 66 of flavoring device 20 is selected to be greater than an inner diameter 84 of bottle 68. Consequently, although device 20 may tilt in bottle 68, device 20 is prevented from fully rotating in a lengthwise direction in bottle 68. Therefore, first and second fins 30 and 32 remain in a generally upward position, as shown in FIG. 6.

Flavoring device 20 is retained in bottle 68 for a minimum duration. Indeed, this minimum duration may be the entire useful life of bottle 68. Openings 54 in sidewall 34 confine flavoring product 22 (FIG. 3) in interior cavity 42 (FIG. 3) of device 20. However, liquid 80 is able to flow into and out interior cavity 42 through openings 54, as indicated by arrows 86, to enable infusion of flavoring product 22 into liquid 80. Thus, while liquid 80 remains in bottle 68, flavors are extracted from flavoring product 22 and infuse into, i.e., add flavor to, liquid 80.

Figure 7:
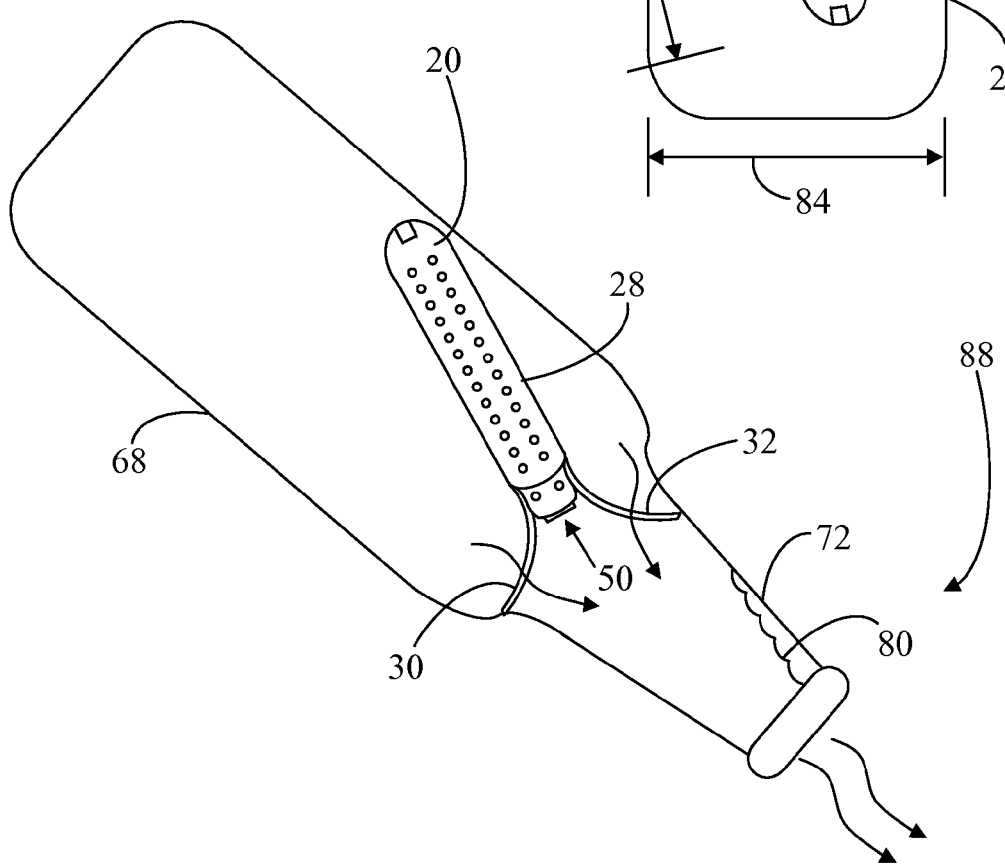
FIG. 7 shows a front view of the bottle demonstrating a position of the device when the bottle is in a tilted position.

FIG. 7 shows a front view of bottle 68 demonstrating a position of flavoring device 20 when bottle 68 is in a tilted position 88. As shown in FIG. 7, cap 82 (FIG. 6) has been removed from bottle 68 and bottle 68 is tilted so that liquid 80 can escape. It should be recalled that after flavoring device 20 is fully inserted into bottle 68, first and second fins 30 and 32, respectively, return back to their neutral position 76. As such when bottle 68 is tilted, fins 30 and 32 abut the inner walls of bottle 68 to prevent device 20 from exiting bottle 68 and to prevent device 20 from getting lodged in neck 72 of bottle 68. That is, the outwardly extending arrangement of first and second fins 30 and 32 in neutral position 76 largely prevents tubular body 28 from entering neck 72 and inhibiting discharge of liquid 80 via neck 72. Furthermore, the curved shape of first and second fins 30 and 32, as well as their extension beyond first end 50 of tubular body 28, produces a largely unobstructed flow of liquid 80 out of bottle 68.

Embodiments described herein entail a device and methodology for adding a flavoring product to a liquid after the production period and during the packaged period. The device includes a tubular body having an interior cavity in which the flavoring product may be loaded. The device also includes at least one outwardly extending flexible fin that flexes inwardly when the device is inserted into a container, and that springs outwardly to prevent the device from exiting the container and/or from getting lodged in the opening of the container. The device is retained in the container for an amount of time sufficient to allow flavor to be extracted from the flavoring product and to infuse into the liquid. The presence of the device in the container can enhance customer appeal because the customer can actually see the flavoring product in their beer. Accordingly, a container filled with a liquid and including the flavoring device can be marketed and sold, thus allowing the additional time needed for greater extraction of the flavoring product. Furthermore, the device can be readily utilized by home brewers, craft brewers, and microbreweries who wish to experiment with and impart their own unique flavor profiles to their beer.

Although the preferred embodiments of the invention have been illustrated and described in detail, it will be readily apparent to those skilled in the art that various modifications may be made therein without departing from the spirit of the invention or from the scope of the appended claims. For example, the shape of flavoring device and fins may vary, the locations and structures of hinges and locking element can differ, and the quantity and locations of openings can be different than those shown.

What is claimed is:

1. A device for adding a flavoring product to a liquid comprising:
a tubular body having a plurality of openings extending through a sidewall of said body to an interior cavity of said body, wherein said interior cavity is adapted to hold the flavoring product, wherein the plurality of openings are sized to confine the flavoring product within the interior cavity, and wherein said tubular body has a trailing end and a leading end; and
a fin coupled to said tubular body proximate said trailing end and extending outwardly from said sidewall,
wherein at least a portion of said fin extends beyond said trailing end in accordance with a lengthwise dimension of said tubular body such that a total length of said device is greater than a length of said tubular body, wherein said device is configured for insertion through an opening in a container and said device exhibits a device length that is greater than an inner diameter of said container, and wherein the leading end is inserted into the container followed by the trailing end.

2. The device as claimed in claim 1 wherein said tubular body comprises:
a first portion; and
a second portion, said first and second portions being movable relative to each other between an open configuration and a closed configuration of said body.

3. The device as claimed in claim 2 wherein:
said tubular body exhibit the lengthwise dimension;
said first portion is a first half of said tubular body aligned with said lengthwise dimension; and
said second portion is a second half of said tubular body aligned with said lengthwise dimension.

4. The device as claimed in claim 2 further comprising:
a hinge coupled to each of said first and second portions for moving said first and second portions between said open configuration and said closed configuration;
a lock element extending from said first portion; and
a receiver element formed in said second portion, said lock element engaging with said receiver element to retain said body in said closed configuration.

5. The device as claimed in claim 1 wherein said fin is a first fin, and said device further comprises a second fin coupled to said sidewall of said tubular body and extending outwardly from said sidewall.

6. The device as claimed in claim 5 wherein said first and second fins are positioned opposite one another on opposing sides of said tubular body in accordance with a widthwise dimension of said tubular body.

7. The device as claimed in claim 1 wherein said fin comprises:
a proximal section coupled to said sidewall of said tubular body, said proximal section extending from said tubular body in approximate alignment with the lengthwise dimension of said tubular body; and
a distal section coupled with said proximal section, said distal section extending outwardly relative to said sidewall of said tubular body.

8. The device as claimed in claim 7 wherein said proximal section and said distal section of said fin are formed to produce said fin having a continuous curved shape.

9. The device as claimed in claim 1 wherein said fin is a flexible member capable of flexing inwardly relative to a widthwise dimension of said tubular body.

10. A device for adding a flavoring product to a liquid comprising:
a tubular body having a plurality of openings extending through a sidewall of said body to an interior cavity of said body, wherein said interior cavity is adapted to hold the flavoring product, wherein the plurality of openings are sized to confine the flavoring product within the interior cavity, and wherein said tubular body has a trailing end and a leading end;
a first fin coupled to said tubular body proximate said trailing end and extending outwardly from said sidewall; and
a second fin coupled to said tubular body proximate said trailing end and extending outwardly from said sidewall, wherein each of said first and second fins comprises:
a proximal section coupled to said sidewall of said tubular body, said proximal section extending from said tubular body in approximate alignment with a lengthwise dimension of said tubular body; and
a distal section coupled with said proximal section, said distal section extending outwardly relative to said sidewall of said tubular body,
wherein said device is configured for insertion through an opening in a container and said device exhibits a device length that is greater than an inner diameter of said container, and wherein the leading end is inserted into the container followed by the trailing end.

11. The device as claimed in claim 10 wherein said tubular body comprises:
a first portion, said first portion being a first half of said tubular body aligned with the lengthwise dimension of said tubular body; and
a second portion, said second portion is a second half of said tubular body aligned with said lengthwise dimension, said first and second portions being movable relative to each other between an open configuration and a closed configuration of said body.

12. The device as claimed in claim 10 wherein said tubular body has a first end and a second end, said first and second fins are coupled to said sidewall of said tubular body proximate said first end, and said first and second fins are positioned on opposing sides of said tubular body in accordance with a widthwise dimension of said tubular body.

13. The device as claimed in claim 10 wherein each of said first and second fins is a flexible member such that when said first and second fins are in a neutral position, a first distance between said distal section of said first fin and said distal section of said second fin is greater than a widthwise dimension of said tubular body, and said distal section of each of said first and second fins are inwardly flexible relative to said widthwise dimension to a second distance between said distal section of said first fin and said distal section of said second fin, said second distance being less than said first distance.

14. A device for adding a flavoring product to a liquid comprising:
- a tubular body having a plurality of openings extending through a sidewall of said body to an interior cavity of said body, wherein said interior cavity is adapted to hold the flavoring product, wherein the plurality of openings are sized to confine the flavoring product within the interior cavity, and wherein said tubular body has a trailing end and a leading end;
- a first fin coupled to said tubular body proximate said trailing end and extending outwardly from said sidewall; and
- a second fin coupled to said tubular body proximate said trailing end and extending outwardly from said sidewall, wherein each of said first and second fins comprises:
  - a proximal section coupled to said sidewall of said tubular body, said proximal section extending from said tubular body in approximate alignment with a lengthwise dimension of said tubular body;
  - a distal section coupled with said proximal section, said distal section extending outwardly relative to said sidewall of said tubular body; and
  - said proximal section and said distal section of said fins are formed to produce said fins having a continuous curved shape; and
- a bottle having a liquid therein, wherein the device is fully inserted into the bottle wherein:
- the leading end is inserted into the bottle followed by the trailing end;
- the first and second fins abut inner walls of the bottle to prevent the device from exiting the bottle and from getting lodged in a neck of the bottle; and
- the curved shape of first and second fins and their extension beyond the first end of the tubular body produces an unobstructed flow of the liquid out of the bottle.

15. The device as claimed in claim 14 wherein each of said first and second fins is a flexible member such that when said first and second fins are in a neutral position, a first distance between said distal section of said first fin and said distal section of said second fin is greater than a widthwise dimension of said tubular body, and said distal section of each of said first and second fins are inwardly flexible relative to said widthwise dimension to a second distance between said distal section of said first fin and said distal section of said second fin, said second distance being less than said first distance.

* * * * *